United States Patent [19]
Bergsma et al.

[11] Patent Number: 5,996,607
[45] Date of Patent: Dec. 7, 1999

[54] INSTALLING A FILL LIMITING VENT VALVE IN A FUEL TANK

[75] Inventors: Rudolph Bergsma, Ann Arbor; Vaughn Mills, Chelsea; Kenneth M. Spink, Jerome; Robert P. Benjey, Dexter, all of Mich.

[73] Assignee: Eaton Corporation, Cleveland, Ohio

[21] Appl. No.: 09/061,076

[22] Filed: Apr. 15, 1998

[51] Int. Cl.⁶ ................................................. F16K 24/04
[52] U.S. Cl. ............................................. 137/202; 137/43
[58] Field of Search ........................................ 137/43, 202

[56] References Cited

U.S. PATENT DOCUMENTS 5,404,907  4/1995  Benjey et al. ......................... 137/43 X
5,687,756  11/1997  VanNatta et al. ....................... 137/202
5,694,968  12/1997  Devall et al. .......................... 137/202

*Primary Examiner*—Gerald A. Michalsky
*Attorney, Agent, or Firm*—Roger A. Johnston

[57] ABSTRACT

A combination fuel tank rollover valve, float actuated fill vent shutoff and tank vapor pressure relief valve assembly in a common housing for assembly into a single access opening in the tank. A header containing the pressure relief valve is sealed over the tank access opening and has an extension member attached to the undersurface of the header with an extension neck extending through the access opening. An interchangeable vent float valve subassembly is attached to the end of the neck before attachment of the extension to the header and assembly on the tank. Tanks of different depth can be accommodated simply by using extension members having a correspondingly different length necks, while the float valve subassembly and header are interchangeable.

8 Claims, 3 Drawing Sheets

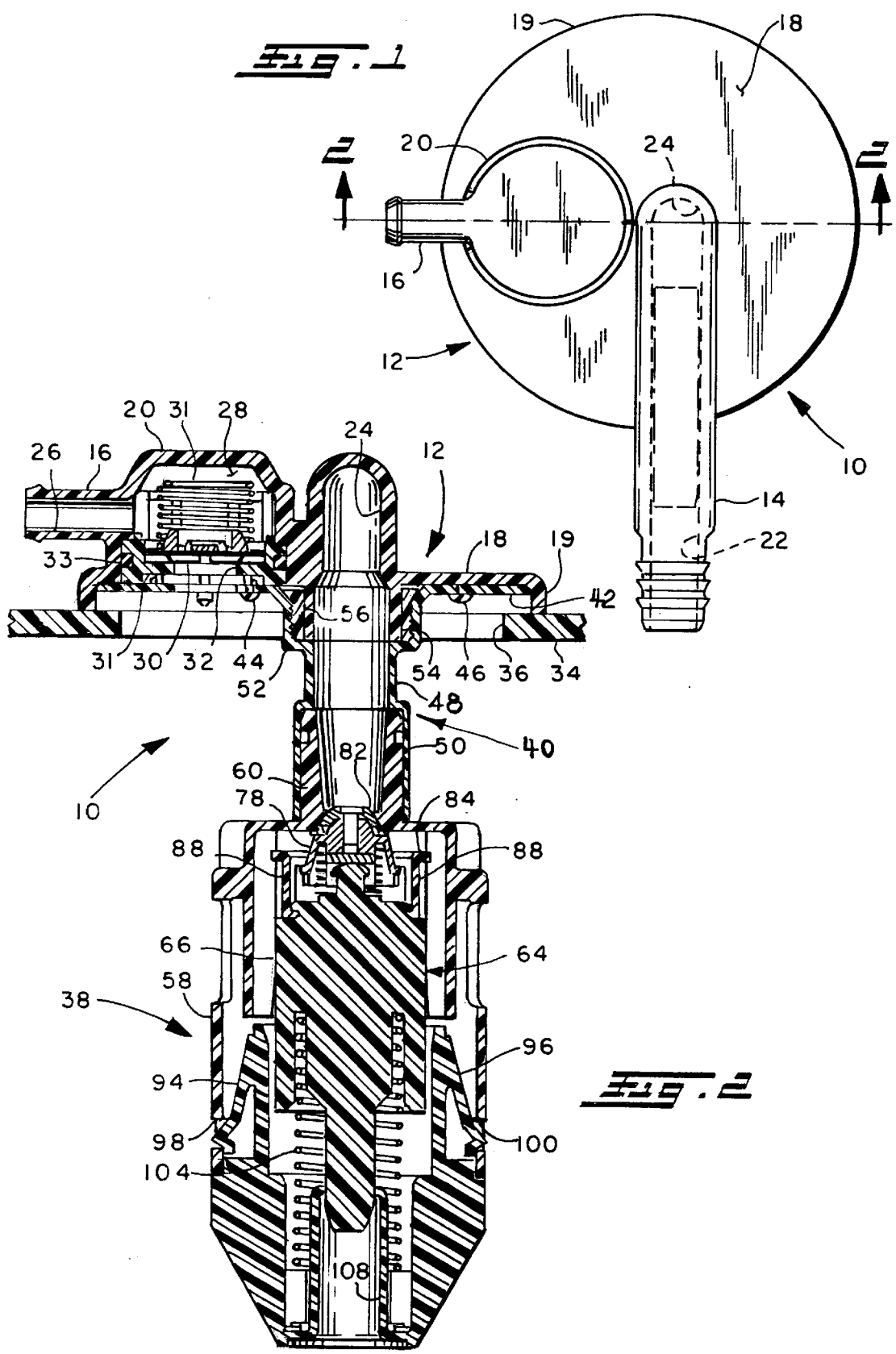

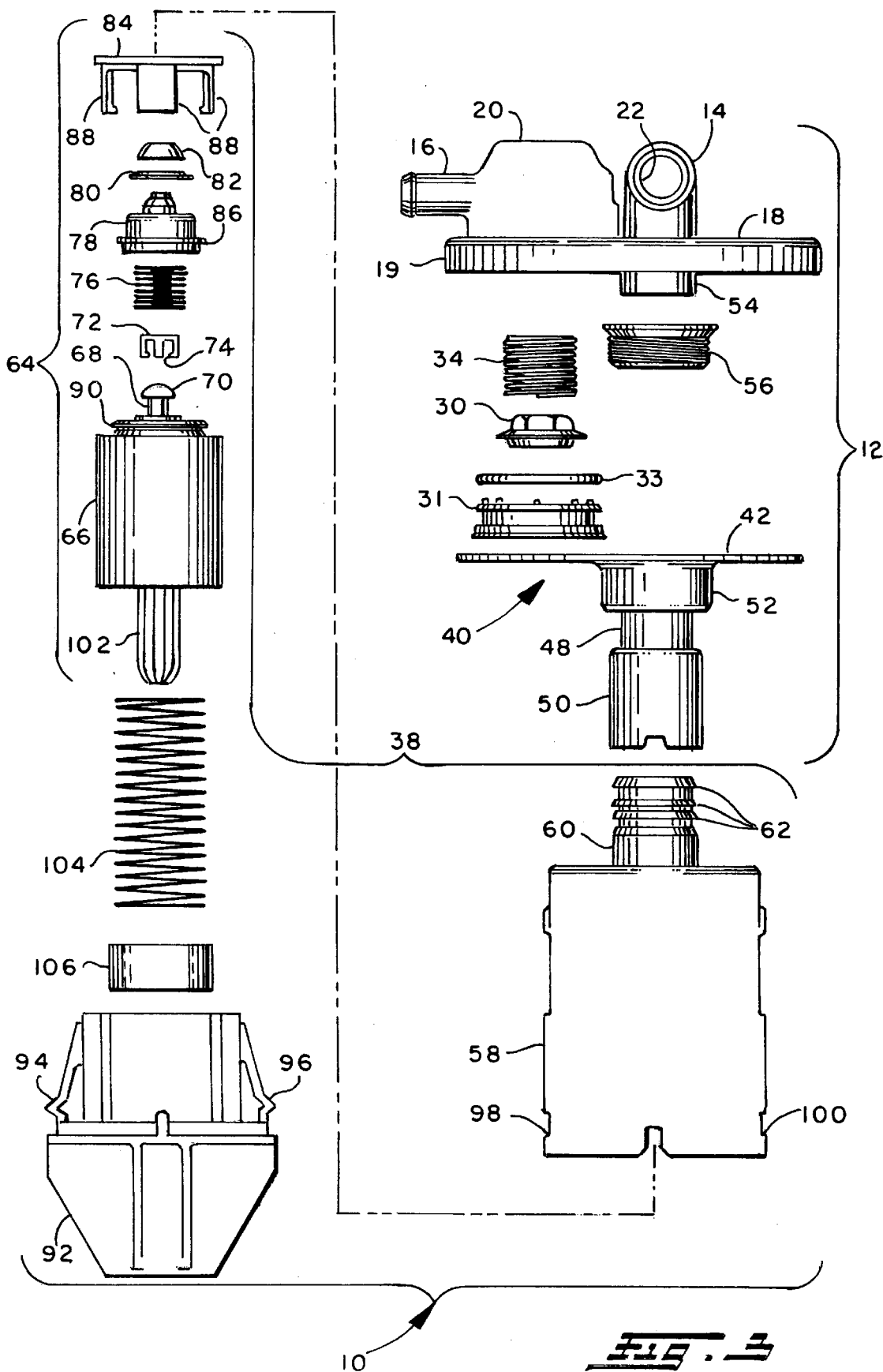

INSTALLING A FILL LIMITING VENT VALVE IN A FUEL TANK

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to devices of the type employed for controlling the vapor venting of motor vehicle fuel tanks during filling and also to provide emergency vent closure in the event of a vehicle rollover. Heretofore, it has been the practice to provide either a vent tube to the filler neck for the tank for venting during filling, in conjunction with a second vent to the vapor collecting canister employed for storage of fuel vapor during periods of engine inoperation and which is purged during engine operation.

Alternatively, the fill vent has also been connected to the canister in more recent vehicle applications. Where a float operated valve is employed to close the fill vent and the vent to the vapor canister, it is necessary to provide a pressure relief valve in the event the vapor pressure in the tank exceeds a predetermined incipient tank rupture threshold to a safety hazard of tank rupture. Heretofore, it has been common practice to provide individual valves for these functions, which has necessitated a plurality of openings in the fuel tank to provide access for each of the valves and vent port arrangements. Recently however, it has been found desirable to combine the various vent and valve functions in a commonly housed unit which can be inserted through a single access opening in the fuel tank to eliminate the need for separate sealing arrangements about the individual openings and thus simplify assembly of the tank and improve seal reliability.

The problem of providing such a commonly housed multiple vent and valve assembly for installation and sealing in a single access opening of a fuel tank is further compounded by the fact that many of the present day vehicle production fuel tanks are molded of plastic or polymeric material which is not compatible with the materials employed for the valve construction and which are capable of withstanding the vibration and impact loading requirements set for vehicle crash safety. Thus, it has been found difficult to provide such a commonly housed assembly for performing the various vent, pressure relief and fill vent shutoff functions which can readily be installed in a single tank access opening and sealed thereabout and accommodate various tank configurations and provide reliability in service.

However, in order to provide a combination vent and plural valve functions in a common unit inserted through a single tank opening, it has been necessary to provide a plurality of different valve housing configurations and float arrangements to accommodate the various tank configurations having different tank depth and fill level. This has necessitated a customized valve arrangement for each different tank configuration in which the valve must then be calibrated for the appropriate liquid shutoff level for the particular tank.

Thus, it has been desired to provide some way or means of having a common tank vent and fill valve shutoff valve which is low in manufacturing cost, and may be easily assembled in tanks of different configuration and capacities in a manner which enables the common valve to accommodate the different tank depths.

BRIEF SUMMARY OF THE INVENTION

The present invention provides a commonly housed valve assembly for providing canister vapor vent, fill vent and vent shutoff and pressure relief and which is configured for mounting and sealing through a single access opening in a fuel tank. In one embodiment, the float valve and housing are formed as a subassembly which is attached to the lower end of a resilient neck portion of an extension member or header which includes the valve ports and pressure relief valve. The float valve subassembly is insertable through the tank opening; whereas, the upper portions of the header extend over the opening and provides sealing thereabout. The resilient extension member is pre-assembled to the header; and, the float valve subassembly is attached to the neck portion of the extension member for installation in the tank.

The header and pressure relief valve subassembly and the float valve subassembly are interchangeable, with only the extension member neck portion to be varied in length for accommodating various different fuel tank depths. The float valve subassembly may be pre-calibrated for the appropriate fuel level closing prior to attachment to the neck for a given known tank depth.

In another embodiment, tabs are provided on the housing of the float valve subassembly for direct connection to the undersurface of the header.

The present invention thus permits a common float valve subassembly and header/pressure relief valve subassembly to be employed for a plurality of tank configurations and depths, with only the extension member required to be customized for any given tank configuration.

BRIEF DESCRIPTION OF THE DRAWINGS

FIG. 1 is a top view of the valve assembly of the present invention;

FIG. 2 is a section view taken along section-indicating lines 2—2 of FIG. 1;

FIG. 3 is an exploded view of the valve assembly of FIG. 1; and,

DETAILED DESCRIPTION OF THE INVENTION

Figure 4:
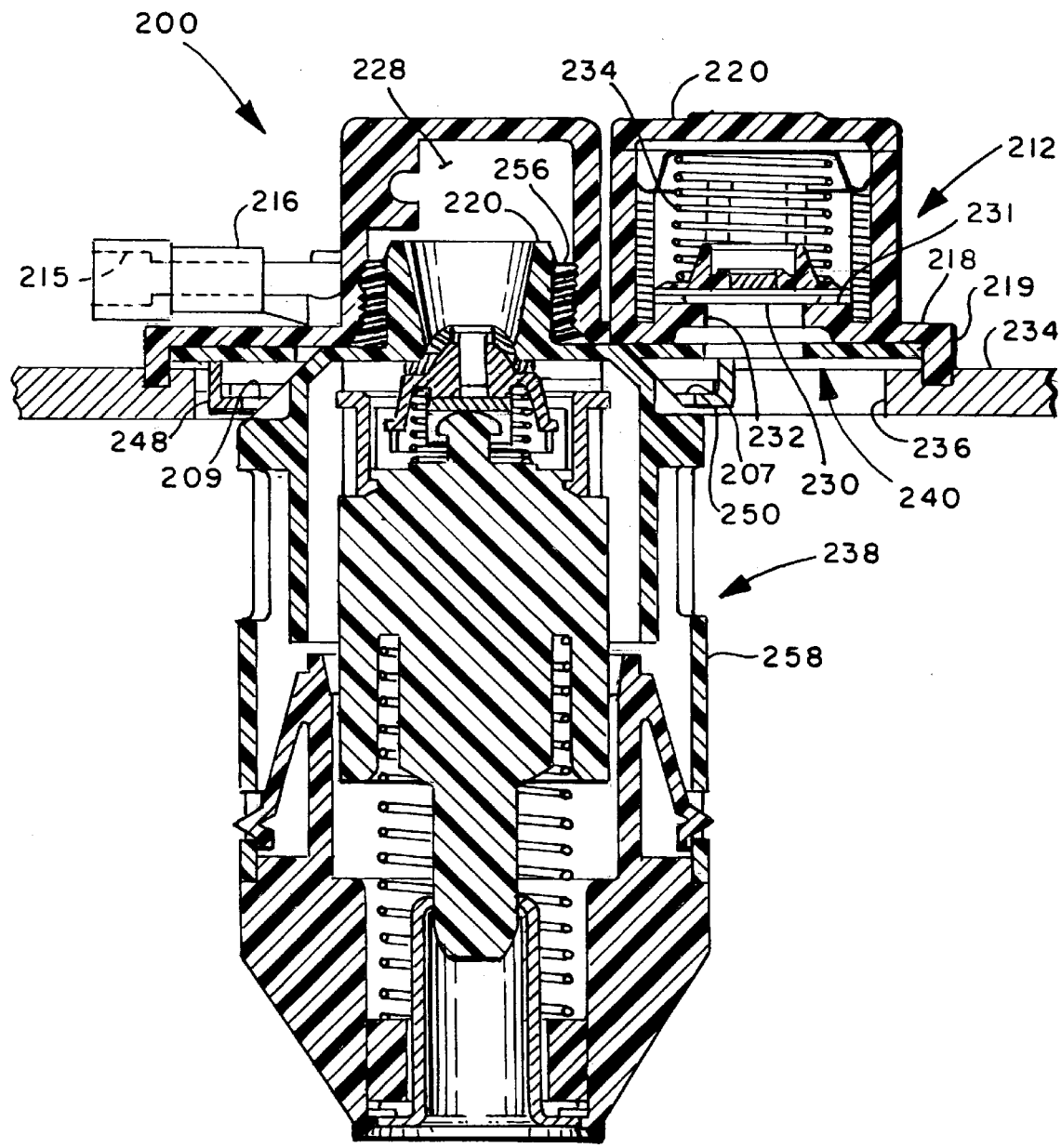
FIG. 4 is a cross-section of an alternate embodiment of the valve of FIG. 1.

Referring to FIGS. 1 and 2, one embodiment of the valve assembly of the present invention is indicated generally at 10 and includes a header assembly indicated generally at 12 which has formed integrally thereon a fill vent tube connector 14 and a pressure relief valve fitting 16 which extends outwardly from a deck portion 18 which includes formed integrally thereon a pressure relief valve housing 20. Vent connector 14 has a central vent passage 22 formed therein which communicates with passage 24 extending downwardly through the deck portion 18.

The pressure relief fitting 16 has passage 26 formed therein which communicates with the interior chamber 28 of the valve housing 20; and, a pressure relief valve member 30 is biased against a valve seat provided about a port 32 which passes through the deck 18. Valve 30 is biased against the valve seat by a suitable spring 31 which permits the valve to open at a preset vapor pressure to vent vapors to the atmosphere through passage 26 in order to prevent over-pressuring of the tank.

With reference to FIG. 2, a portion of a tank wall is illustrated and denoted by reference numeral 34 and has an aperture 36 formed therein through which the float valve subassembly indicated generally at 38 is installed as will hereinafter be described in greater detail. The deck portion 18 of the header assembly 12 has a peripheral flange 19 which overlies the aperture 36 and is registered against the surface of the fuel tank and sealed thereagainst by any suitable expedient, as for example, weldment. It will be understood that the header deck portion 18 and flange 19 are formed of a suitable material compatible with weldment to the material of tank 34 which is typically formed of plastic material.

Referring to FIGS. 2 and 3, an extension member indicated generally at 40 has an upper flange portion 42 which is registered against the undersurface of deck 18 within the peripheral flange 19, and secured thereto by suitable expedient, as for example, heat staking of projections 44, 46 from the undersurface of deck 18 through apertures formed in the flange 42 as indicated in FIG. 2. Extension 40 includes a downwardly extending neck 48 which has an enlarged diameter portion 50 formed at the lower end thereof and an enlarged diameter hollow hub 52 formed with the intersection of flange 42. The hollow hub portion 52 of extension 40 is sealed about a downwardly extending tubular pilot 54 formed on the undersurface of deck 18. The extension 54 is sealed in hub 52 by a suitable resilient seal ring 56.

In the present practice of the invention, the length of the extension member 40 is varied by fabricating the member with increased or decreased length for the neck 48 in order to position the float valve assembly 38 in the correct position with respect to the bottom of the fuel tank for fill vent closure.

The extension member 48 is formed of a suitable polymeric material having good fuel resistant properties and high impact resistance and from such a material that is deemed to be relatively non-hydroscopic. In particular, the impact resistance of the material is chosen such that resistance to vibration and shock loading of the neck 42, in the event of a vehicle crash, is sufficient to prevent the inertia of valve assembly 38 from severing the neck 48. In the present practice of the invention, a polyketone thermoplastic material sold under the trade name "Carilon™" manufactured by Shell Oil Company has been found particularly satisfactory; however, it will be understood that other thermoplastic materials having the desired chemical and mechanical properties may be employed.

Referring to FIGS. 2 and 3, the float valve assembly includes a housing 58 which has a reduced diameter tubular extension 60 extending upwardly from the end thereof Extension 60 is received, preferably in a press fit, in the interior of the enlarged diameter portion 50 of the extension 40. The tubular extension 60 is secured in the portion 50 by any suitable expedient such as for example frictional engagement of annular barbs 62 formed therearound and/or weldment.

Housing 58 has disposed therein the float valve subassembly indicated generally at 64 and is formed of material not weldable to the tank. The float subassembly 64 includes a float 66 preferably formed of plastic material of suitable specific gravity and chemical resistance chosen to permit immersion in gasoline or diesel fuel. Referring to FIG. 3, the upper end of float 66 has a post 68 extending therefrom which has a radially outwardly extending annular flange 70 formed on the upper end thereof over which is received, in snap engagement, a cage member 72 which is permitted limited axial movement of the cage with respect to post 68 with the cage retained thereon by suitable lugs 74 provided on the lower end of the legs of cage 72. A spring 76 is received over cage 72 and has a lower end thereof registered on the upper surface of float 66 with a cap member 78 received over the upper end of spring 76. The cap has a resilient annular seal 80 received thereon and retained by a retainer cup 82 received over the cap 78 and engaged thereon by any suitable expedient, as for example, snap locking.

An annular retainer 84 is received over cap 78 and engages a flange 86 formed therearound to limit the upward movement of cap 78 under the urging of spring 76. The retainer 84 has a plurality of legs 88 extending downwardly therefrom which engage the upper surface of float 66 by suitable spring tabs in a snap lock engagement about annular rib 90 formed on the upper surface of the float 66.

Referring to FIGS. 2 and 3 float assembly 64 is received in the lower end of the housing 58. Base 92 has barbed spring tabs 94, 96 extending laterally therefrom which engage slots 98, 100 formed in the sides of housing 58. A pilot portion 102 extends downwardly from float 66 through the center of spring 104 and is received by guide 108 in base 92. Referring to FIG. 2, a calibration sleeve 106 is placed in the bottom of base 92 to support and calibrate spring 104. Calibration is accomplished by moving sleeve 106 upwardly to a predetermined load or force and is secured or locked in place by sonic weldment to maintain the load. It will thus be understood that the float subassembly 64 is pre-assembled into the float valve subassembly 38 prior to assembly to the extension member 40. The float valve subassembly 3 8 may be pre-calibrated prior to assembly on to the extension member 40.

The embodiment of FIGS. 1 through 3 is thus able to accommodate varying fuel tank depths utilizing a common float assembly 68 and header assembly 12 with only a change in the extension member 40 required by providing a different length to the neck portion 48 for tank configurations.

Referring to FIG. 4 another embodiment of the invention is illustrated generally at 200 as having a tank wall 234 with an opening 236 therein through which is received a float valve subassembly indicated generally at 238 which is identical to the float valve assembly 38 of the embodiment of FIGS. 1 through 3 except for the provision of mountings tabs 207, 209 extending outwardly from the upper end of the housing 258.

In the embodiment of FIG. 4 a member is indicated generally at 240 is provided which is functionally similar to extension member 40 except that the downwardly extending portions are omitted; and, instead a plurality of engagement lugs 248, 250 are provided on the underside thereof which are engaged by tabs 209, 207, respectively to maintain the float valve assembly 238 attached to the undersurface of member 240. Member 240 is in turn secured to the undersurface of the header deck 218 by any suitable expedient, as for example, heating staking or weldment. The header assembly indicated generally at 212 of FIG. 4 has a vent valve member 230 biased closed against a valve seat 231 formed in the header deck 218 inside a housing 220 and biased closed by a spring 234. Valve seat 231 has an aperture 232 which communicates through an aperture in the member 240 to the opening 236 in the tank wall.

The float valve subassembly 258 has the neck portion 260 thereof extending into a cavity 228 formed in the header 212 and sealed therein by a suitable resilient seal ring 256. The header has a vent port (not shown) which communicates with chamber 228. The embodiment of FIG. 4 thus permits direct attachment of the float valve subassembly 238 to the undersurface of the header for use with shallow tanks. The header has a peripheral flange 219 which is attached to the upper surface of the tank surrounding opening 236 by any suitable expedient, as for example, weldment to retain and seal the header onto the tank.

The present invention thus provides a float operated fill vent shutoff and pressure relief valve combined in a common housing for assembling and sealing into a fuel tank through a single opening in the tank wall in a manner which is economical to manufacture and which provides a reliable seal and easy assembly.

Although the invention has hereinabove been described with respect to the illustrated embodiments, it will be understood that the invention is capable of modification and variation and is limited only by the following claims.

We claim:

1. A fill limiting vent valve assembly for installation in a fuel tank access opening comprising:

(a) a valve module including (i) a body sized to be inserted in said access opening, (ii) a float valve, (iii) a vent port closed by said float valve at a predetermined position of said float valve , and (iv) said body having formed thereon a plurality of attachment surfaces;

(b) a retaining member having a flange portion sized and configured so as to overlap said tank opening and a tubular neck portion communicating with said vent port, said neck portion having certain mounting portions thereof in contact with said body attachment surfaces;

(c) means for retaining said mounting portions in contact with said body attachment surfaces; and, (d) a cover member having a vent outlet communicating with said module vent port upon assembly of said cover over said retaining member, wherein said cover is secured to said tank t hereby retaining said module therein.

2. The assembly defined in claim 1, wherein said cover is formed of material weldable to said tank and said body is formed of material not weldable to said tank.

3. The assembly defined in claim 1, wherein said means for retaining includes weldment.

4. The assembly defined in claim 1, wherein said means for retaining includes press fitting.

5. The assembly defined in claim 1, wherein said module includes a resilient seal sealing about said vent port in said cover.

6. The assembly defined in claim 1, wherein said cover is formed of polyethylene material and said module body is formed by polyketone thermoplastic material.

7. The assembly defined in claim 1, wherein said retaining member is pre-assembled to said cover by heat staking.

8. A fill limiting valve assembly for installation in a fuel tank access opening comprising:

(a) a valve module including (i) a body sized to be inserted in said access opening, (ii) a float valve, (iii) a vent port closed by said float valve at a predetermined position of said float valve and (iv) said body having formed thereon a plurality of attachment surfaces;

(b) a retaining member having a flange portion sized and configured so as to overlap said tank opening and a tubular neck Portion communicating with said vent port, said neck portion having certain mounting portions thereof extending in said opening and in contact with said body attachment surfaces, wherein said certain mounting portions including a resilient shock absorbing portion; and, (c) a cover member having a vent outlet communicating with said module vent port upon assembly of said cover over said retaining member, wherein said cover is secured to said tank thereby retaining said module therein.

\* \* \* \* \*